United States Patent
Schultz et al.

(10) Patent No.: US 6,525,516 B2
(45) Date of Patent: *Feb. 25, 2003

(54) SWITCHING REGULATOR WITH CAPACITANCE NEAR LOAD

(75) Inventors: Aaron M. Schultz, Sunnyvale, CA (US); Andrew J. Burstein, Mountain View, CA (US); David B. Lidsky, Oakland, CA (US); Anthony J. Stratakos, Fremont, CA (US)

(73) Assignee: Volterra Semiconductor Corporation, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/457,407

(22) Filed: Dec. 7, 1999

(65) Prior Publication Data

US 2002/0000797 A1 Jan. 3, 2002

(51) Int. Cl.$^7$ .............................. G05F 1/40; G05F 1/10
(52) U.S. Cl. ...................... 323/282; 323/222; 323/284
(58) Field of Search ................................ 323/282, 283, 323/284, 285, 286, 290, 271, 224, 222; 363/63, 17, 132; 365/226

(56) References Cited

U.S. PATENT DOCUMENTS

| | | | | |
|---|---|---|---|---|
| 4,161,023 A | * | 7/1979 | Goffeau ........................ 363/124 |
| 4,347,474 A | * | 8/1982 | Brooks et al. ............... 323/224 |
| 4,906,901 A | * | 3/1990 | Carroll ........................ 315/297 |
| 5,287,372 A | * | 2/1994 | Ortiz ............................ 372/25 |
| 5,397,976 A | * | 3/1995 | Madden et al. ............. 323/271 |
| 5,440,519 A | * | 8/1995 | Mart et al. .................. 365/226 |
| 5,552,695 A | * | 9/1996 | Schwartz .................... 323/271 |
| 5,563,838 A | * | 10/1996 | Mart et al. .................. 365/226 |
| 5,627,413 A | * | 5/1997 | Mughir et al. ................ 307/86 |
| 5,903,449 A | * | 5/1999 | Garrigan et al. ............ 363/41 |
| 5,959,442 A | * | 9/1999 | Hallberg et al. ............ 323/223 |
| 5,982,160 A | * | 11/1999 | Walters et al. ............. 323/282 |
| 5,982,180 A | * | 11/1999 | Walters et al. ............. 323/282 |
| 6,064,187 A | * | 5/2000 | Redl et al. .................. 323/285 |

OTHER PUBLICATIONS

Jung S–H et al., "An Integrated CMOS DC–DC Converter For Battery–Operated Systems", New York: IEEE, US vol. 1, 1999, pp. 43–47, XP000924705 ISBN: 0–7803–5422–2, No date.

* cited by examiner

Primary Examiner—Rajnikant B. Patel
(74) Attorney, Agent, or Firm—Fish & Richardson P.C.

(57) ABSTRACT

A voltage regulator has an input terminal, an output terminal, a first transistor to intermittently form an electrical circuit between the input terminal and the output terminal, a rectifier connecting an intermediate terminal in the electrical circuit between the input terminal and the output terminal to ground, a controller that drives the first transistor, and a capacitorless filter. Capacitance for the filter function can be provided by a capacitor, e.g., the input capacitor of the load, located in the load chip or on the same printed circuit board as the load chip. The capacitorless filter can include an inductor connected between the intermediate terminal and the output terminal, or the inductance can be provided by parasitic effects in the connections between the voltage regulator and load.

27 Claims, 3 Drawing Sheets

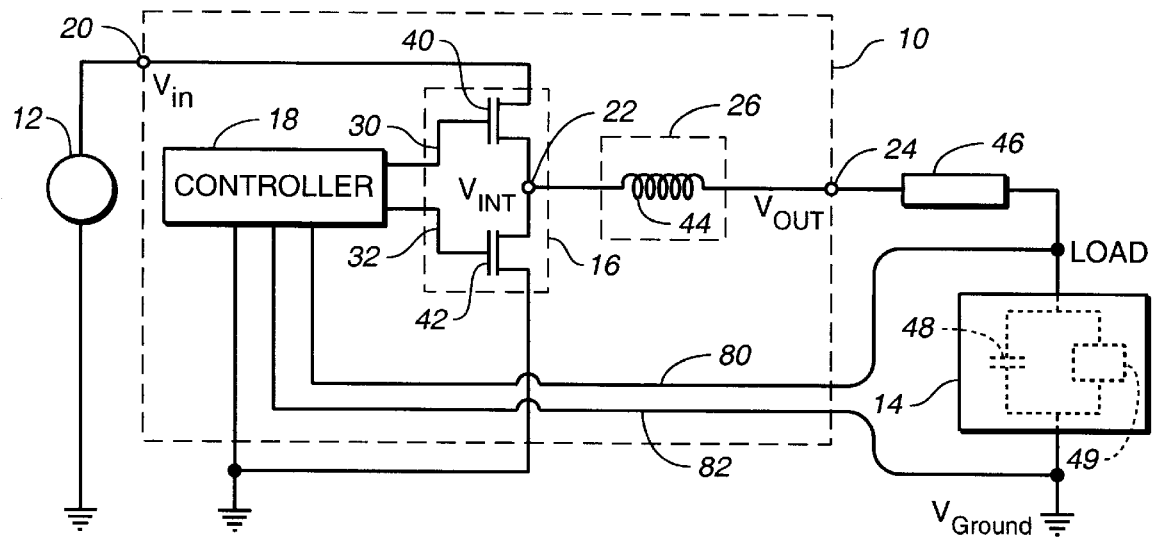
FIG._1
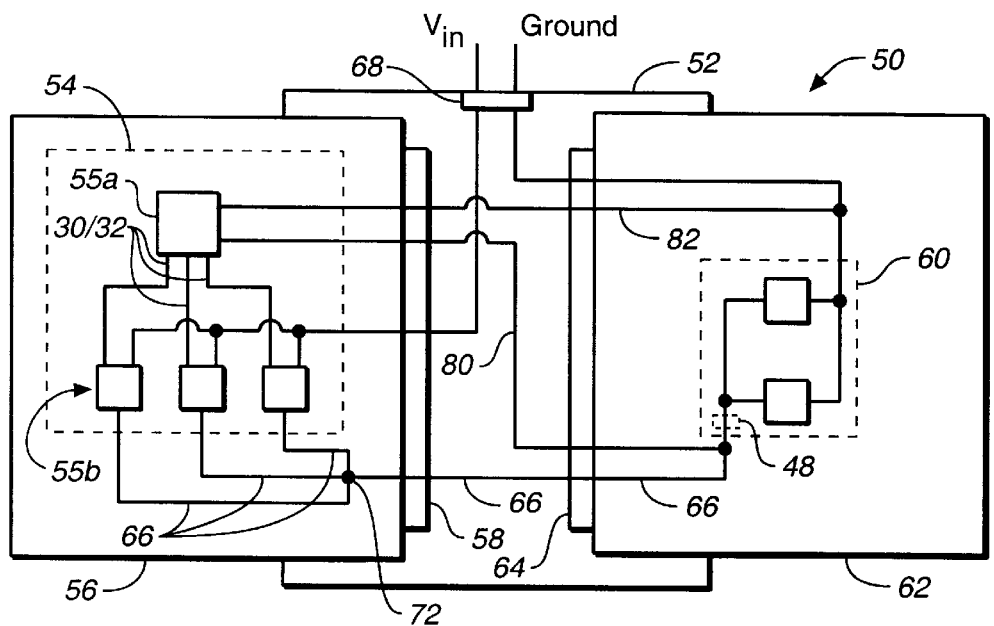
FIG._2

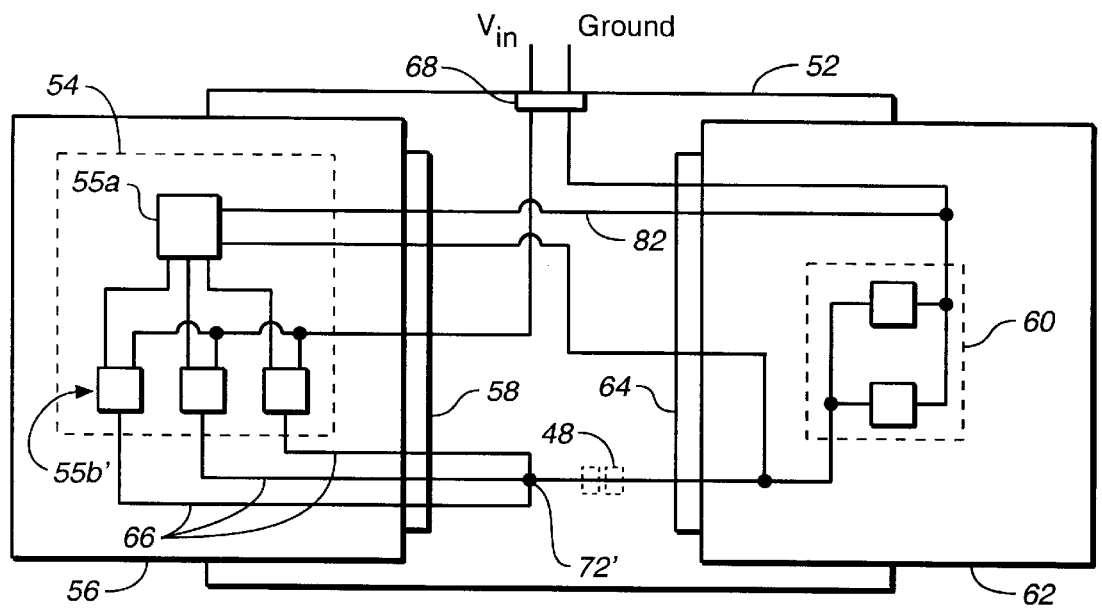
FIG._3
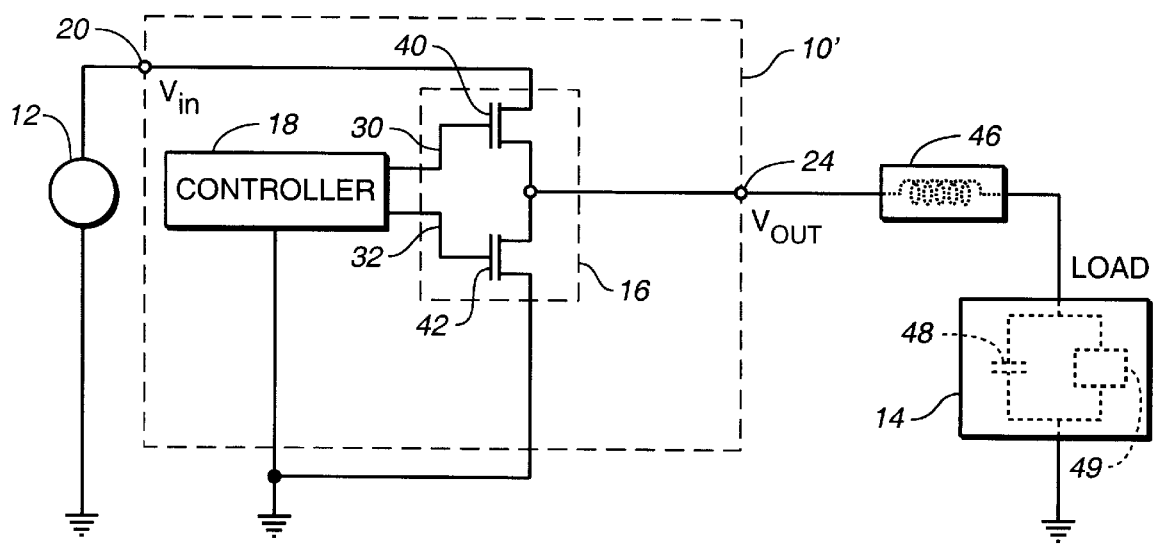
FIG._4

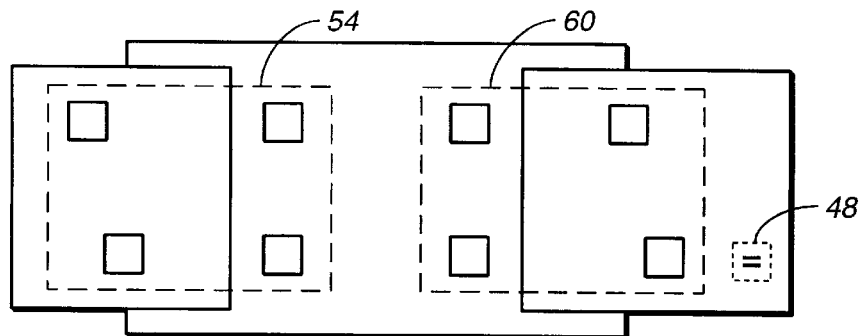
FIG._5A
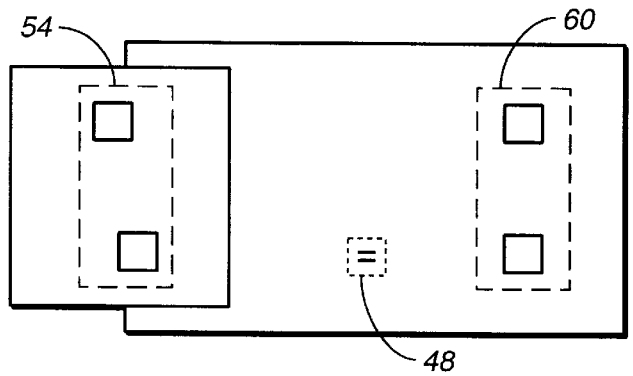
FIG._5B
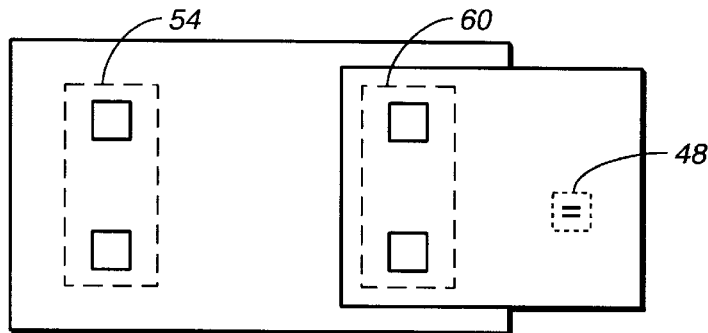
FIG._5C
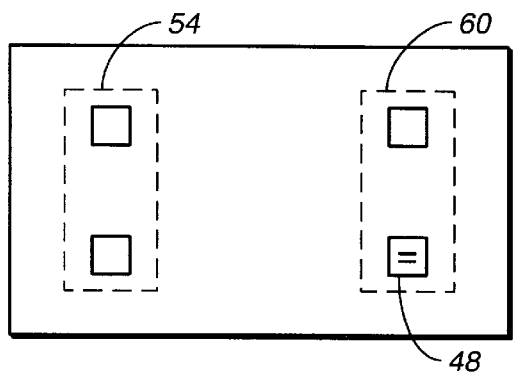
FIG._5D

SWITCHING REGULATOR WITH CAPACITANCE NEAR LOAD

BACKGROUND

The present invention relates generally to voltage regulators.

Voltage regulators, such as DC to DC converters, are used to provide stable voltage sources for electronic systems. Efficient DC to DC converters are particularly needed for battery management in low power devices, such as laptop notebooks and cellular phones. Switching voltage regulators (or simply "switching regulators") are known to be an efficient type of DC to DC converter. A switching regulator generates an output voltage by converting an input DC voltage into a high frequency voltage, and filtering the high frequency voltage to generate the output DC voltage. Specifically, the switching regulator includes one or more switches to alternately couple and decouple an unregulated input DC voltage source, such as a battery, to a load, such as an integrated circuit. An output filter, typically including an inductor and a capacitor, is coupled between the input voltage source and the load to filter the output of the switch and thus provide the output DC voltage. A controller, such as a pulse width modulator or a pulse frequency modulator, controls the switches to maintain a substantially constant output DC voltage.

There is a shift to smaller inductors in switching regulator filters in order to increase switching regulator speed. Unfortunately, one problem is that the impedance of the filter elements in the switching regulator is becoming so small that parasitic impedance, e.g., parasitic inductance in the connection elements between the voltage regulator and the load, can adversely affect the switching regulator performance. A typical connection between the switching regulator and load can include a first socket in which the switching regulator is mounted, a second socket in which a processor or memory chip is mounted, and a trace between the first and second sockets. Each of these elements contributes to the parasitic inductance of the connection. When the parasitic inductance of the connection is combined with the input capacitor in the load and the filter capacitor in the switching regulator, a CLC network can be formed. This CLC network is a source of instability in the switching regulator performance.

In addition, the drive to high performance computers will result in devices that require faster shifts and shifts of larger magnitude in the load current. Consequently, switching regulators with higher reaction speed to changes in the load current will be needed.

SUMMARY

In one aspect, the invention is directed to a voltage regulator having an input terminal, an output terminal, a first transistor to intermittently form an electrical circuit between the input terminal and the output terminal, a rectifier connecting an intermediate terminal in the electrical circuit between the input terminal and the output terminal to ground, a controller that drives the first transistor, and a capacitorless filter. The capacitorless filter includes an inductor connected between the intermediate terminal and the output terminal.

Implementations of the invention may include the following features. The rectifier may include a second transistor, and the controller may drive the first and second transistors to alternately couple the intermediate terminal between the input terminal and ground. The first transistor may be a PMOS transistor, and the second transistor may be an NMOS transistor. The voltage regulator may be a buck converter, a boost converter, or a buck-boost converter.

In another aspect, the invention is directed to an electronic device that includes a voltage regulator and a load. The voltage regulator has an input terminal to couple to a voltage source and an output terminal, a first transistor to intermittently form an electrical circuit between the input terminal and the output terminal, a rectifier coupling an intermediate terminal in the electrical circuit between the input terminal and the output terminal to ground, a controller that drives the first transistor, and a capacitorless filter including an inductor coupled between the intermediate terminal and the output terminal. The load has elements coupled to the output terminal and an input capacitor between the output terminal and ground. In conjunction with the inductor of the voltage regulator, the input capacitor provides a filter so that the voltage to the elements of the load remains substantially constant.

Implementations of the invention may include the following features. At least a portion of the voltage regulator may be fabricated on a first chip and at least a portion of the load may be fabricated on a second chip. The first and second chips may be mounted on a printed circuit board, and the input capacitor may be mounted on the printed circuit board. The first chip may be mounted on a first printed circuit board, the second chip may be mounted on a second printed circuit board. The first printed circuit board may be mounted on the second printed circuit board, or the second printed circuit board may be mounted on the first printed circuit board, or the first and second printed circuit boards may be mounted on a third printed circuit board. The input capacitor may be mounted on the first printed circuit board, the second printed circuit board or the third printed circuit board, or fabricated in the second chip.

In another aspect, the invention is directed to an electronic device that has a voltage regulator, a load and a capacitor. The voltage regulator includes an input terminal to couple to a voltage source and an output terminal, a first transistor to intermittently form an electrical circuit between the input terminal and the output terminal fabricated on a plurality of first integrated circuit (IC) chips, a rectifier coupling an intermediate terminal in the electrical circuit between the input terminal and the output terminal to ground, and a controller that drives the first transistor. The load is fabricated at least partially on a second integrated circuit (IC) chip that receives power from the output terminal of the voltage regulator. The capacitor is located near the second IC chip that provides the necessary capacitance to filter current entering the load and create a substantially DC voltage at the load.

Implementations of the invention may include the following features. The plurality of first IC chips may be located on a first printed circuit board and the second IC chip may be located on a second printed circuit board. A current summing node to sum current from the plurality of first IC chips may be located on the first printed circuit board, or the current summing node can be located off the first printed circuit board.

In another aspect, the invention is directed to an electronic device that has a voltage regulator, an electrical connector having a parasitic inductance, and a load. The voltage regulator has an input terminal to couple to a voltage source and an output terminal, a first transistor to intermittently form an electrical circuit between the input terminal and the output terminal, a rectifier coupling an intermediate terminal in the electrical circuit between the input terminal and the output terminal to ground, and a controller that drives the first transistor. The load has active elements coupled by the electrical connector to the output terminal, the load further including an input capacitor between the output terminal and ground, wherein in conjunction with the parasitic inductance of the electrical connector, the input capacitor provides a filter so that the voltage to the active elements of the load remains substantially constant.

Implementations of the invention may include the following features. At least a portion of the voltage regulator may be fabricated on a first chip and at least a portion of the load may be fabricated on a second chip. At a least a portion of the parasitic inductance may be provided by traces on a printed circuit board. The second chip may be mounted on a printed circuit board, and at least a portion of the parasitic inductance may be provided by a connector between the second chip and the printed circuit board. The first chip may be mounted on a first printed circuit board, the second chip may be mounted on a second printed circuit board, and at least a portion of the parasitic inductance may be provided by a connector between the first and second printed circuit boards.

In another aspect, the invention is directed to an electronic device that has a voltage regulator, a load and a capacitor. The voltage regulator has an input terminal to couple to a voltage source and an output terminal, a first transistor to intermittently form an electrical circuit between the input terminal and the output terminal fabricated on a first integrated circuit (IC) chip that is mounted on a first printed circuit board, a rectifier coupling an intermediate terminal in the electrical circuit between the input terminal and the output terminal to ground, and a controller that drives the first transistor. The load is fabricated at least partially on a second integrated circuit (IC) chip that is mounted on a second printed circuit board, and the load receives power from the output terminal of the voltage regulator. The capacitor is located on the second printed circuit board and provides, in conjunction with inductance located between the input node and the load, a filter that creates a substantially DC voltage at the load.

Implementations of the invention may include the following features. The controller may be at least partially fabricated on a third integrated (IC) circuit chip. The capacitor may be an input capacitor for the second IC chip. The capacitor may be selected to ensure that the input capacitor can effectively shunt sufficient current that the voltage across the load remains substantially constant. The inductance may be provided by an inductor coupled between the input terminal and the output terminal of the switching regulator, and the inductor in the filter may be supplemented by a parasitic inductance in a connection between the output terminal and the local capacitor. The inductance may be provided by a parasitic inductance in a connection between the output terminal and the local capacitor. The parasitic inductance may occur in a connection between the second IC chip and the second printed circuit board, in a connection between the first IC chip and the first printed circuit board, or in a connection between the first printed circuit board and the second printed circuit board.

Advantages of the invention may include the following. The capacitive elements of the switching regulator filter, i.e., the output capacitor elements, can be located entirely on the motherboard, on a peripheral board on which the load chip is mounted, or in the load chip itself. This reduces the parasitic impedance between the capacitors and the load, thereby enhancing the speed with which the switching regulator can react to changes in the load current. By eliminating the filter capacitor from the voltage regulator side, creation of a CLC network can be avoided, and the stability of the switching regulator can be improved. In addition, the feedback control path can be simpler and more stable. The switching regulator and load can be located in different modules separated by sockets. All of the output capacitance elements may be located in the load module, and can be very close to the load in order to filter out very fast current transients. The switching regulator can be manufactured at lower cost by placing the capacitance at the load.

Other features and advantages of the invention will become apparent from the following description, including the drawings and the claims.

BRIEF DESCRIPTION OF THE DRAWINGS

FIG. 1 is a block diagram of a switching regulator.

FIG. 2 is a block diagram of an electronic device that includes the switching regulator of FIG. 1.

FIG. 3 is a block diagram of an electronic device in which the summing node for multiple power switch chips is located on the motherboard.

FIG. 4 is a block diagram of a switching regulator in which inductance is provided by connections between the switching regulator and the load.

FIGS. 5A–5D are block diagrams of an electronic device in which some of the power switch chips and/or some of the load chips are located on the motherboard

DETAILED DESCRIPTION

Referring to FIG. 1, a switching regulator 10 is coupled to an unregulated first DC input voltage source 12, such as a battery, by an input terminal 20. The switching regulator 10 is also coupled to a load 14, such as an integrated circuit, by an output terminal 24. The switching regulator 10 serves as a DC-to-DC converter between the input terminal 20 and the output terminal 24. The switching regulator 10 includes a switching circuit 16 which serves as a power switch for alternately coupling and decoupling the input terminal 20 to an intermediate terminal 22. The switching circuit 16 includes a rectifier, such as a switch or diode, coupling the intermediate terminal 22 to ground. Specifically, the switching circuit 16 may include a first transistor 40 having a source connected to the input terminal 20 and a drain connected to the intermediate terminal 22 and a second transistor 42 having a source connected to ground and a drain connected to the intermediate terminal 22. The first transistor 40 may be a P-type MOS (PMOS) device, whereas the second transistor 42 may be an N-type MOS (NMOS) device.

The intermediate terminal 22 is coupled to the output terminal 24 by an output filter 26. In combination with the capacitance (represented by a phantom capacitor 48) of electronic elements outside the switching regulator 10, the output filter 26 converts the rectangular waveform of the intermediate voltage at the intermediate terminal 22 into a substantially DC output voltage at the load 14. Specifically, in a buck-converter topology, the output filter 26 includes an inductor 44 connected between the intermediate terminal 22 and the output terminal 24. The inductance of the inductor 44 may be supplemented by the parasitic inductance (represented by impedance box 46) of the connection between the output terminal 24 and the input capacitor 48. The combination of the inductor 44 and the parasitic inductance 46 provides the energy storage function required by the switching regulator. Thus, the inductance of the inductor 44 should be selected so that, when combined with the parasitic inductance 46, it provides sufficient inductance to provide the energy storage function.

Unlike a standard buck-converter, the output filter 26 of the switching regulator 10 does not include an output capacitor connected in parallel with the load 14. Specifically, the capacitance needed for the filtering function can be located on the motherboard, on a peripheral board on which the load chips are mounted, or in the IC chip or chips that constitute the load 14. Specifically, the switching regulator 10 uses capacitance of the input capacitor(s) in the load (represented by phantom capacitor 48) to provide the capacitance needed for the filtering function. In fact, the capacitance of the input capacitor 48 in the load 14 can be increased beyond what would normally be specified for the load to ensure that the input capacitor can effectively shunt current so that the voltage across the active elements of the load (represented by phantom impedance box 49) remains substantially constant. Consequently, none of the output capacitance need be located on the same chip or board as the switching regulator circuitry 10. Since the capacitance of the filtering function is closer to the active elements of the load, the parasitic impedance between the filter capacitor and the load is reduced or eliminated, thereby enhancing the speed with which the switching regulator can react to changes in the load current.

During a PMOS conduction period, the first transistor is closed, and the source 12 supplies energy to the load 14 and the inductors 44 and 46 via the first transistor 40. On the other hand, during an NMOS conduction period, the second transistor 42 is closed, and energy is supplied by the inductors 44 and 46. Although the switching circuit 16 and the output filter 26 are illustrated in a buck converter topology, the invention is also applicable to switching regulator topologies that normally include an output capacitor, such as a boost converter or a buck-boost converter topology.

The switching regulator also includes a controller 18 for controlling the operation of the switching circuit 16. A first control line 30 connects the PMOS transistor 40 to the controller 18, and a second control line 32 connects the NMOS transistor 42 to the controller 18. The controller 18 causes the switching circuit 16 to alternate between PMOS and NMOS conduction periods so as to generate an intermediate voltage $V_{int}$ at the intermediate terminal 22 that has a rectangular waveform. The controller 18 can include a feedback circuit (not shown) which measures the output voltage and the current passing through the load. Although the controller 18 is typically a pulse width modulator, the invention is also applicable to other modulation schemes, such as pulse frequency modulation.

Referring to FIG. 2, an electronic device 50, e.g., a laptop computer, can include a first printed circuit board (or motherboard) 52, one or more voltage regulator IC chips 54 mounted on a second printed circuit board (or voltage regulator board) 56 that is connected to the motherboard 52 by a first socket 58, and one or more memory and processing IC chips 60 mounted on a third printed circuit board (or processor board) 62 that is connected to the motherboard 52 by a second socket 64. Electrical connections on the printed circuit boards can be formed by traces 66. The voltage regulator IC chips 54 can include both controller chips 55a, on which the controller and feedback system is fabricated, and power switch chips 55b, on which the switching circuitry is fabricated. The IC chips can be mounted on the PC boards 56 and 62 with conventional techniques, such as wire bonds, ball grid arrays and mounting sockets. The voltage regulator IC chips 54 are connected to a power terminal 68 that can be coupled to a wall socket, e.g., by an AC to DC converter, or to a battery to serve as the input voltage source 12. In the implementation shown with multiple power switch chips 55b, the current summing node 72 is located on the voltage regulator board 56. This eliminates the need for a pin on the socket 58 for each power switch chip 55b to carry the output current connecting the voltage regulator board 56 to the motherboard 52.

Alternatively, as shown in FIG. 3, in an implementation with multiple power switch chips 55b', the current summing node 72' can be located on the motherboard 52. This requires a pin in the socket 58 for each power switch chip 55b' to carry the output current. The length of the traces on the motherboard 52 and the structure of the socket pins can be selected to provide each power switch chip 55b with different parasitic inductance.

The switching regulator 10 is fabricated at least partially on the voltage regulator IC chips 54. Anything on the motherboard or the peripheral boards that is powered by the switching regulator 10, e.g., the memory and processor chips 60, provides the load 14. The parasitic inductance 46 is provided by the connections between the IC chips, e.g., the traces or lead lines 66, the sockets 58 and 64, the mounting of the chips on the printed circuit board, or by the parasitic inductance within the IC chips 54 and 60 themselves. The input capacitor(s) can be located within the memory and processor chips 60, on the processor board 62, or on the motherboard 52. One or more feedback lines 80, 82 may connect the memory and processor IC chips 60 to the controller 18 in the voltage regulator IC chip 54. Electrical characteristics of the voltage regulator, such as the voltage at the input capacitor, may be measured and passed to the controller 18 through the feedback lines 80, 82. By moving the capacitance of the filtering function to the voltage regulator IC chips, the parasitic impedance between the filtering capacitance and the load is reduced. Thus, the speed with which the switching regulator can react to changes in the load current is enhanced. In addition, as previously mentioned, the parasitic inductance can supplement the inductor 44, thereby permitting the switching regulator to be manufactured with a smaller inductor at lower cost.

Since the voltage on the ground line at the voltage regulator board may differ from the voltage on the ground line at the load, e.g., due to inductance in the load and ground lines, the controller 18 in the switching regulator 10 may use differential remote sensing. Specifically, the first feedback line 80 is used to measure the output voltage $V_{out}$, and the second feedback line 82 used to measure the ground voltage at the load $V_{ground}$. The controller then uses the difference $\Delta V = V_{out} - V_{ground}$ to control the switching circuit 16.

Although the controller can be fabricated entirely on the controller chips 55a, at least some of the controller "intelligence" can be fabricated on the power switch chips 55b. For example, the power switch chips 55b can include circuitry to interpret commands sent by the controller in the controller chip 55a to determine whether to open or close the PMOS and NMOS transistors.

Referring to FIG. 4, in another implementation, the switching regulator 10' can be constructed with an "inductorless" filter. In this implementation, the parasitic inductance of the connector elements, e.g., the traces and sockets, provide the necessary inductance for the filtering function.

The length and layout of the trace on the printed circuit boards connecting the voltage regulator chips to the load chips can be adjusted to provide a desired inductance.

Of course, many alternative implementations are possible. The power switch of the switching regulator can be fabricated on a single chip or on multiple chips, and these power switch chips can operate in a single phase or multiple phase mode. The switching regulator can be implemented as a single chip solution in which the power switch(es) and the controller are fabricated on the same chip, or a multiple chip solution in which the power switch(es) and the controller are fabricated on separate chips. As shown in FIG. 5A, some or all of the switching regulator chips and/or the load chips can be mounted directly on the motherboard (in which case the connection between the motherboard and peripheral board might not contribute to the parasitic impedance), instead of on peripheral boards. In this case, the load capacitor 48 can be located on the peripheral board that has only load chips. As shown in FIG. 5B, the regulator chips can be located on a peripheral board and the load chips can be mounted on the motherboard. In this case, the input load capacitor 48 can be mounted on the motherboard or located in the load chip(s). As shown in FIG. 5C, the regulator chips can be located on the motherboard and the load chips can be mounted on a peripheral. In this case, the load capacitor 48 can be mounted on the peripheral board or located in the load chip(s). As shown in FIG. 5D, both the regulator chips and the load chips can be mounted on the motherboard. In this case, the load capacitor 48 can be located in the load chip(s).

The voltage regulator can include multiple chips located on different peripheral boards, and the load can include multiple chips located on different peripheral boards. The inductor 44 for the power regulator filter can be mounted to one of the voltage regulator chips, to the voltage regulator board, or to the motherboard, or part or all of the inductance can be provided by parasitic inductance. This parasitic inductance can be provided by solder balls, wire bonds, socket connections, conductive traces on printed circuit boards, and parasitic effects within the memory and processor chips. The voltage regulator board 56 and the processor board 62 can be mounted on the motherboard 52 by electrical connections other than sockets. Although in most implementations the active elements of the load function as a current sink, the active elements can also function as a current source.

The invention has been described in terms of particular embodiments. Other embodiments are within the scope of the following claims.

What is claimed is:

1. An electronic device, comprising:
   a voltage regulator having an input terminal to couple to a voltage source and an output terminal, a first transistor to intermittently form an electrical circuit between the input terminal and the output terminal, a rectifier coupling an intermediate terminal in the electrical circuit between the input terminal and the output terminal to ground, a controller that drives the first transistor, and a capacitorless filter including an inductor, the capacitorless filter coupled between the intermediate terminal and the output terminal; and
   a load having elements coupled to the output terminal, the load further including an input capacitor between the output terminal and ground, wherein in conjunction with the inductor of the voltage regulator the input capacitor provides a filter so that the voltage to the elements of the load remains substantially constant.

2. The electronic device of claim 1, wherein at least a portion of the voltage regulator is fabricated on a first chip and at least a portion of the load is fabricated on a second chip.

3. The electronic device of claim 2, further comprising a printed circuit board, and wherein the first and second chips are mounted on the printed circuit board.

4. The electronic device of claim 3, wherein the input capacitor is located in the second chip.

5. The electronic device of claim 2, further comprising a first printed circuit board and a second printed circuit board mounted on the first printed circuit board, and wherein the first chip is mounted on the first printed circuit board and the second chip is mounted on the second printed circuit board.

6. The electronic device of claim 5, wherein the input capacitor is mounted on the second printed circuit board.

7. The electronic device of claim 2, further comprising a first printed circuit board and a second printed circuit board mounted on the first printed circuit board, and wherein the first chip is mounted on the second printed circuit board and the second chip is mounted on the first printed circuit board.

8. The electronic device of claim 7, wherein the input capacitor is mounted on the first printed circuit board.

9. The electronic device of claim 2, wherein the first chip is mounted a first printed circuit board, the second chip is mounted on a second printed circuit board, and the first and second printed circuit boards are mounted on a third printed circuit board.

10. The electronic device of claim 9, wherein the input capacitor is mounted on the second printed circuit board.

11. The electronic device of claim 9, wherein the input capacitor is mounted on the third printed circuit board.

12. The electronic device of claim 2, wherein the input capacitor is fabricated in the second chip.

13. An electronic device, comprising:
   a voltage regulator having an input terminal to couple to a voltage source and an output terminal, a first transistor to intermittently form an electrical circuit between the input terminal and the output terminal, a rectifier coupling an intermediate terminal in the electrical circuit between the input terminal and the output terminal to ground, and a controller that drives the first transistor, wherein the voltage regulator does not have an inductor coupled between the intermediate terminal and the output terminal;
   an electrical connector having a parasitic inductance; and
   a load having active elements coupled by the electrical connector to the output terminal, the load further including an input capacitor between the output terminal and ground, wherein in conjunction with the parasitic inductance of the electrical connector, the input capacitor provides a filter so that the voltage to the active elements of the load remains substantially constant.

14. The electronic device of claim 13, wherein at least a portion of the voltage regulator is fabricated on a first chip and at least a portion of the load is fabricated on a second chip.

15. The electronic device of claim 14, further comprising a printed circuit board, and wherein at least a portion of the parasitic inductance is provided by traces on the printed circuit board to couple the first chip to the second chip.

16. The electronic device of claim 14, further comprising a printed circuit board on which the second chip is mounted, and at least a portion of the parasitic inductance is provided by a connector between the second chip and the printed circuit board.

17. The electronic device of claim 14, further comprising a first printed circuit board and a second printed circuit board coupled to the first printed circuit board, and wherein the first chip is mounted on the first printed circuit board and the second chip is mounted on the second printed circuit board, and at least a portion of the parasitic inductance is provided by a connector between the first and second printed circuit boards.

18. An electronic device, comprising:

a voltage regulator having an input terminal to couple to a voltage source and an output terminal, a first transistor to intermittently form an electrical circuit between the input terminal and the output terminal fabricated on a first integrated circuit (IC) chip that is mounted on a first printed circuit board, a rectifier coupling an intermediate terminal in the electrical circuit between the input terminal and the output terminal to ground, a controller that drives the first transistor, and a capacitorless filter including an inductor, the capacitorless filter coupled between the intermediate terminal and the output terminal;

a load fabricated at least partially on a second integrated circuit (IC) chip that is mounted on a second printed circuit board, the load receiving power from the output terminal of the voltage regulator; and a capacitor located on the second printed circuit board, the capacitor providing, in conjunction with inductance located between the input node and the load, a filter that creates a substantially DC voltage at the load.

19. The electronic device of claim 18, wherein the controller is at least partially fabricated on a third integrated (IC) circuit chip.

20. The electronic device of claim 18, wherein the capacitor is an input capacitor for the second IC chip.

21. The electronic device of claim 18, wherein the capacitance of the capacitor is selected to ensure that the input capacitor can effectively shunt sufficient current that the voltage across the load remains substantially constant.

22. The electronic device of claim 18, wherein the inductance is provided by an inductor coupled between the input terminal and the output terminal of the switching regulator, and the inductor in the filter is supplemented by a parasitic inductance in a connection between the output terminal and the local capacitor.

23. The electronic device of claim 18, wherein the inductance is provided by a parasitic inductance in a connection between the output terminal and the local capacitor.

24. The electronic device of claim 23, wherein the parasitic inductance occurs in a connection between the second IC chip and the second printed circuit board.

25. The electronic device of claim 23, wherein the parasitic inductance occurs in a connection between the first IC chip and the first printed circuit board.

26. The electronic device of claim 23, wherein the parasitic inductance occurs in a connection between the first printed circuit board and the second printed circuit board.

27. An electronic device, comprising:

a voltage regulator having an input terminal to couple to a voltage source and an output terminal, a first transistor to intermittently form an electrical circuit between the input terminal and the output terminal, a rectifier coupling an intermediate terminal in the electrical circuit between the input terminal and the output terminal to ground, a controller that drives the first transistor, and a capacitorless filter including an inductor, the capacitorless filter coupled between the intermediate terminal and the output terminal; and a load having elements coupled to the output terminal, the load further including an input capacitor between the output terminal and ground, wherein the filter does not include a capacitor connected in parallel with the load, and wherein the inductor of the voltage regulator and the input capacitor of the load provide a filter so that the voltage to the elements of the load remains substantially constant.

* * * * *